3,160,606
METHOD OF PREPARING POLYCARBONATES
Joseph J. Dietrich, Orange, Tex., and Henry C. Stevens, Akron, Ohio, assignors to Pittsburgh Plate Glass Company, Pittsburgh, Pa., a corporation of Pennsylvania
No Drawing. Filed Mar. 27, 1962, Ser. No. 182,931
15 Claims. (Cl. 260—47)

This invention relates to the preparation of polycarbonates and more particularly concerns improved methods of preparing high molecular weight polycarbonates. It is especially relevant to formation of high molecular weight aromatic polycarbonates from bisphenols and phosgene.

One class of reaction useful in preparing polycarbonates may be viewed as directly or indirectly reacting (or consuming) a plurality of carbonic acid halide groups and a plurality of hydroxyl groups with the consequent formation of the multiplicity of carbonate linkages in the polycarbonate. Generalizing, this over-all effect may be illustrated as:

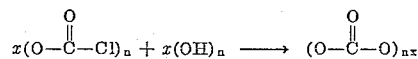

$n$ representing values of two or more and $x$ being a large value. In this sense, formation of polycarbonates are the consequence of interreaction between polyfunctional compounds which contribute (directly or indirectly) reactive carbonic acid halides and hydroxyl groups.

Polycarbonates, by way of illustration, may be obtained from an organic diol and a bishaloformate of a diol by a reaction which may be expressed as:

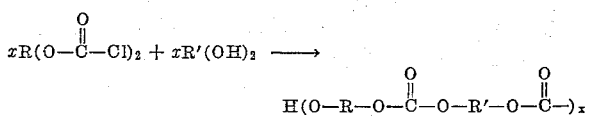

$x$ representing a large value, R and R' denoting either the same or different organic groups. In such a fashion, an organic compound having a reactive hydroxyl group and a reactive carbonic acid halide group (e.g., a monochloroformate of an organic diol) may be used as the source of the groups which give rise to a plurality of carbonate linkages and hence a polycarbonate.

It is not essential to formation of many polycarbonates that organic compounds having the carbonic acid halide groups be preformed. Instead, the carbonic acid halide groups may be viewed as formed in situ. Thus, aromatic diols, notably bisphenols, may be phosgenated (i.e., phosgene passed into an aqueous alkaline solution of a bisphenol) to obtain polycarbonates. Since phosgene reacts with alcoholic and phenolic hydroxyl groups especially in the presence of alkali, such phosgenation can be regarded as including in an intermediate step formation of carbonic acid chloride (chloroformate) groups.

This invention deals principally with an improved method for forming polycarbonates by processes of the class above discussed, e.g., processes in which the carbonate linkages are directly or indirectly provided at the expense of hydroxyl and carbonic acid halide groups. It will, however, be understood that the invention is not predicated nor dependent upon the expressed characterization of reaction. The discussion is intended to characterize in simple conveniently expressed terminology the type of chemical reaction (which is undoubtedly considerably more complex) to which the invention is related.

According to this invention, a novel, simple and particularly effective process is provided for forming polycarbonates by reactions of the type above characterized involving formation of a multiplicity of carbonate linkages in polycarbonate products directly or indirectly from a plurality of carbonic acid halides and a plurality of hydroxyl groups. A notable feature and consequence of the invention is the enhanced rate or rapidity with which it leads to high molecular weight polycarbonates.

These and other advantages may be realized in preparing polycarbonates by the characterized processes from a reaction medium formed from an organic diol, especially a bisphenol, an aqueous inorganic alkali solution and a water insoluble organic solvent for the polycarbonate product by completing polycarbonate formation in an emulsified reaction medium. Surprising results ensue by completing the polycarbonate formation in the emulsion. One of the more notable benefits is the striking increase in the rapidity of high molecular weight polycarbonate formation. The emulsion has the effect of accelerating greatly the formation of high molecular weight polycarbonate, reducing the reaction period to but a minor fraction, i.e., less than one-fifth, of what otherwise would be employed.

The emulsion or emulsified reaction medium is a synthetic condition created by altering the normal state of the reaction medium through various expedients some of which are hereinafter explained in considerable detail. One of the definitive characteristics of the state which the reaction medium assumes when emulsified is the dispersion of a good portion of its aqueous phase, usually at least 50 weight percent or more, in the form of fine droplets in the organic phase. No appreciable portion of the aqueous phase so dispersed as a discontinuous phase in the continuous organic phase of the emulsion readily phase separates upon standing under quiescent conditions in less than an hour. Often it requires many hours or even days for the emulsion to collapse upon standing. Breaking of the emulsion may require positive steps such as acidification as by addition of hydrochloric acid.

When the reaction mixture is emulsified according to the better practices, as outlined hereinafter, the emulsion occupies a preponderant portion of the reaction medium. Thus, while prior to emulsification the organic phase (if phase separation under quiescent conditions is permitted) may comprise half the volume, the emulsion will seemingly occupy better than 75 percent and more usually 90 percent or more of the total volume of the reaction medium.

The emulsified portion of the reaction medium is a thick, pasty mass visually resembling whipped cream but having a firmer texture. Usually, it is quite sticky and will adhere to an inserted and withdrawn glass rod.

For example, in the phosgenation of a reaction medium formed from Bisphenol A, aqueous sodium hydroxide solution and methylene chloride attainment of the higher molecular weight polycarbonates often requires extended reaction periods of ten hours to even several days. Thus, while low molecular weight products form in shorter periods, these extended times are required for higher molecular weight polycarbonates. In contrast, by completing polycarbonate formation in emulsified reaction medium but several hours, usually less than three, often between one and two hours, suffice.

Among the high molecular weight polycarbonates of especial interest are those provided from alkylidene bisphenols. Such high molecular weight aromatic polycarbonates are exemplified by the phosgenation products of a reaction mixture formed from Bisphenol A, 2,2-(4,4'-dihydroxydiphenyl)-propane, an aqueous sodium hydroxide solution and a water insoluble organic solvent for the polycarbonate such as methylene chloride or like partially halogenated aliphatic hydrocarbons. These Bisphenol A polycarbonates may be represented by the structural formula:

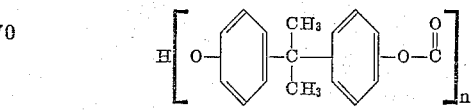

wherein $n$ is preferably a large value, e.g., at 20 to 300. An unusually effective relatively rapid process for providing such high molecular weight bisphenol polycarbonates is provided by this invention. Nevertheless, the invention is useful in the formation of various other polycarbonates, notably polycarbonates having aromatic groups in their repeating structure.

In typical practice, a reactor is charged with Bisphenol A, an aqueous sodium hydroxide solution and methylene chloride or like water insoluble organic solvent. While agitating the reaction medium, phosgene is added gradually, typically at a rate such that the addition consumes 30 to 200 minutes. In this fashion, between 1.0 and 1.3 moles of phosgene per mole of Bisphenol A in the reaction medium are charged.

Once established in the reactor and during the phosgenation, the reaction medium is heterogeneous in character. Agitation serves to disperse the respective phases and provide this heterogeneity. Without gentle stirring, the medium separates into a heavier organic phase comprised mainly of methylene chloride and product polycarbonate, and an aqeuous phase containing water soluble components of the reaction medium which may include sodium hydroxide, sodium chloride, and water soluble forms of Bisphenol A such as phenates of Bisphenol A.

During the phosgene addition, reaction or reactions are apparently occurring, leading to the formation of polycarbonates. High molecular weight polycarbonates, however, are not immediately obtained. Instead, lower molecular weight polycarbonates are apparently first formed. Even with continued stirring of the reaction medium after concluding phosgene addition, the chloroformate chlorine content of the reaction medium remains for prolonged periods at a level which indicates high molecular weight polycarbonates are not formed rapidly.

In accordance with the discovery of the present invention formation of high molecular weight polycarbonates of Bisphenol A is unexpectedly catalyzed or accelerated by changing the physical character in the reactor of the heterogeneous reaction mixture from a predominantly phase separable state to an emulsion which does not settle in a short time upon standing. When the reaction medium is converted to an emulsion, the disappearance of chloroformate chlorine from the reaction medium is greatly accelerated. High molecular weight Bisphenol A polycarbonates are formed.

In its normal state, the reaction mixture during and subsequent to phosgenation is heterogeneous, comprised of an organic phase (principally constituted of the solvent and components soluble therein) and an aqueous phase (constituted primarily of water and water soluble components such as caustic, sodium chloride and any water soluble forms of Bisphenol A such as the phenates of Bisphenol A). On standing and without agitation, this reaction mixture quickly separates (in a matter of minutes) into two reasonably distinct phases, the respective volumes of each phase corresponding approximately to volumes of water and water insoluble organic solvent charged to the reactor.

On the other hand, when this reaction medium is emulsified, it is converted into a thick pasty mass which visually resembles whipped cream. The emulsion persists once formed for a considerable time, i.e., many hours and even for several days. It does not quickly phase separate into two large phases. Instead, the volume of the emulsion occupies the major portion of the reaction medium. A small decantable aqueous phase may be present along with the emulsion, but its volume is small compared with the amount of charged liquids.

The emulsion occupies a considerably greater portion of the total volume of the reaction mixture than the normally encountered organic phase. It is not unusual for its volume to be 1.5 to 5 times that of the normal organic phase which separates upon standing.

Organic constituents of the reaction mixture, primarily the organic solvent and components soluble therein including polycarbonate, comprise the emulsion's continuous phase. Dispersed with unusual uniformity throughout this continuous organic phase and constituting the discontinuous phase are innumerable small spheres of the aqueous and water soluble components. Microscopic examination of this emulsion as it is formed and initially exists in the reaction medium shows the small spheres are less than 5 microns, e.g., 0.5 to 5 microns, predominantly 1 to 2 microns, in diameter. Generally, these spheres are dispersed with unusual uniformity throughout the continuous phase and are characteristically quite uniform in size.

Various expedients are useful in converting the heterogeneous unemulsified reaction medium into a suitably emulsified form. One of the most effective techniques comprising a preferred embodiment of this invention involves violently agitating a relatively small portion of the reaction medium after at least a portion of the phosgenation has occurred by stirring with a stirrer at tens of thousands of revolutions per minute. When violently agitated in this or a comparable manner, usually for at least one minute, characteristics of the small portion are changed drastically and the desirable emulsion is formed. By placing this emulsified material in contact with the reaction medium, the entire reaction medium will emulsify, usually in the course of several minutes to an hour. Gentle stirring such as used during the phosgenation facilitates this.

A convenient, effective procedure is to withdraw and emulsify a small portion of the reaction medium. However, a small portion may be emulsified by isolating and agitating violently within the reaction medium a small portion thereof as by insertion of an apparatus which isolates and agitates the small portion within (or while surrounded by) the balance of the reaction medium. It is also possible to agitate violently a localized portion of the reaction medium to achieve appropriate emulsification.

Moreover, the small amount of emulsified material need not be derived from the specific reaction medium which ultimately initiates emulsification. Thus, in batch operations, a small emulsified portion of an earlier batch will serve to initiate emulsification of an ensuing batch.

Quite small amounts of emulsified material will effectively initiate emulsification of the main reaction medium. As little as about 0.5 percent of emulsified material by volume of the main reaction medium suffices. Of course, even larger amounts of emulsified material are useful. Generally, the emulsified material is used in amounts of between 1 and 5 percent by volume of the main medium.

Other conditions should advisedly prevail in order to facilitate emulsification of the main medium when the small emulsified portion is incorporated. Thus, it is recommended that agitation of the main medium be avoided while adding the emulsified portion. Preferably, the main medium should be allowed to separate into its two principal phases, as will occur when agitation is not employed (e.g., organic phase and aqueous phase), when the emulsion is added.

Once the emulsion is added, the medium is agitated by gentle stirring of the type used during the phosgenation. Thus, in many procedures, the agitation usually employed in forming the main reaction medium is discontinued, emulsion added and thereafter the agitation resumed.

Furthermore, it is also frequently preferable to add the emulsion to a main reaction medium which has been phosgenated to an extent of between 5 and 17 percent, ideally about 6 to 10 percent, stoichiometric excess phosgene. That is, between 5 and 17 percent mole excess of phosgene (based upon the phosgene required to form the polycarbonate from the organic diol and the alkali used) is added to the reaction medium before the emulsion is added. Nevertheless, it is possible to add emulsion to a medium phosgenated to a greater or lesser degree.

The following example illustrates this procedure for emulsifying the reaction medium and obtaining high molecular weight polycarbonates:

Example I

Into a three-necked, one liter flask equipped with a paddle stirrer, 33.6 grams (0.84 mole) of sodium hydroxide and 310 milliliters of water were charged. After the hydroxide had dissolved, 68.4 grams (0.3 mole) of Bisphenol A was added and allowed to dissolve. To this mixture 180 milliliters of methylene chloride was added.

While stirring this mixture by operating the stirrer at 300 revolutions per minute, 33.6 grams (0.34 mole) of phosgene was added uniformly over a period of 50 minutes. The temperature of the mixture was maintained at 25° C. A typical chloroformate chlorine content at this point was 6 percent by weight of the polycarbonate.

A small portion (50 milliliters) of the mixture then in the flask was withdrawn, and in a beaker emulsified by violently stirring for one minute with a Brookfield Counter-Rotating Stirrer operating at 10,000 revolutions per minute.

This emulsion was added to the contents of the flask with the stirrer inoperative, and thereafter the contents were gently stirred by rotating the stirrer at 300 revolutions per minute for 2 hours at which time the chloroformate chlorine content was 0.001 percent by weight of the polycarbonate. Conversion of the flask's contents to the desired emulsion occurred shortly after charging the added emulsified medium.

This emulsion then was broken by addition of dilute hydrochloric acid, the organic phase separated, washed free of chloride, dried over anhydrous sodium sulfate and evaporated to obtain a high molecular weight Bisphenol A polycarbonate having a K-value of 58.

By comparison, it requires 10 to 24 hours of gentle agitation in the absence of the emulsion to reduce the chloroformate chlorine content to 0.001 percent and obtain a polycarbonate of comparable K-value (molecular weight).

In the foregoing example, the mole ratio of sodium hydroxide and/or phosgene to Bisphenol A employed has been varied using 2.8 to 3.5 moles of sodium hydroxide and 1.05 to 1.3 moles of phosgene per mole of Bisphenol A with comparable results.

It is also possible to use comparable mechanical expedients for emulsifying the reaction mixture, or preferably a portion thereof.

On a larger scale, the procedure of Example I was performed as follows:

Example II

A twenty-gallon, jacketed, stirrer-equipped kettle maintained under a nitrogen atmosphere was charged with 13.83 liters of water, 3.285 kilograms (42.2 moles) of high purity aqueous sodium hydroxide solution containing 51.1 percent NaOH by weight, 3.42 kilograms (15 moles) of Bisphenol A and 9.0 liters of methylene chloride. Only half the sodium hydroxide and none of the methylene chloride was added until all the Bisphenol A had dissolved.

After cooling the contents of the kettle to 25° C. by circulating liquid coolant in the jacket, 1.66 kilograms (16.77 moles) of gaseous phosgene was added at an essentially constant rate over a period of 60 minutes while operating the stirrer at 120 revolutions per minute. A small sample (about 1 liter) of the reaction mixture was withdrawn and emulsified by violent agitation for about one minute with a Brookfield Counter-Rotating Stirrer operated at 10,000 revolutions per minute.

This emulsified sample was returned to the kettle with the agitator shut off and the contents of the kettle separated into two predominant phases. Emulsification of the reaction mixture was then accomplished while resuming normal stirring for 2 hours. At this point, essentially complete formation of polycarbonate was achieved; all chloroformate chlorine was reacted.

The emulsion was broken and the mixture transformed into a readily phase separable composition comprising an aqueous phase and an organic phase (principally methylene chloride having dissolved polycarbonate product) by adding 18 liters of methylene chloride. After phase separation, the organic layer was washed chloride ion free with water and the polycarbonate product isolated from the methylene chloride by adding heptane to precipitate granular polycarbonate.

Rather than mechanically emulsifying a portion of the batch from which emulsification of the entire batch is then accomplished, high speed violent agitation of the entire mixture is also effective as indicated by the following example:

Example III

Into a three-necked, one liter flask equipped with a paddle stirrer, 33.6 grams (0.84 mole) of sodium hydroxide and 310 milliliters of water were charged. After the hydroxide had dissolved, 68.4 grams (0.3 mole) of Bisphenol A was added and dissolved. To this mixture 180 milliliters of methylene chloride was added.

While operating the paddle stirrer at 300 revolutions per minute, 33.6 grams (0.34 mole) of phosgene was added uniformly over a period of 50 minutes. The temperature of the mixture was maintained at 25° C. A typical chloroformate chlorine content at the end of the phosgene addition was 6 percent by weight of the polycarbonate.

The resulting reaction mixture was transferred to a large beaker wherein it was violently agitated for one minute with a Brookfield Counter-Rotating Stirrer operated at 10,000 revolutions per minute. The resulting emulsion was agitated gently for 2 hours after which it contained 0.001 percent chloroformate chlorine by weight of the polycarbonate.

The polycarbonate recovered by the procedure of Example I had a K-value of 58.

On a larger scale, the emulsification procedure of Example III is performed best by localized violent agitation. This, for example, involves subjecting a portion of the interfacial area of the two phases comprising the reaction medium to violent agitation. Thus, violent agitation of the whole reaction medium is not essential.

Emulsification of the reaction medium may be accomplished prior to completing the phosgenation. Thus, although not recommended, a portion of the phosgenation (or addition of phosgene) may be conducted in an emulsified reaction medium. When phosgene (gaseous or liquid) is added to a reaction mixture, the reaction medium may be emulsified even while the addition of phosgene continues. Emulsification should not, however, be effected until at least about one-third of the total phosgene has been fed. Best emulsification and polycarbonate formation are realized when emulsification is accomplished after concluding the phosgene addition.

Other techniques for emulsifying the reaction medium are available.

One, illustrated by Example IV, accomplishes emulsification by controlling the manner in which sodium hydroxide or like inorganic alkali is incorporated in the reaction medium. For example, in a batch phosgenation only about one-half the total NaOH required (1.2 to 1.4 moles of NaOH per mole of Bisphenol A) is charged initially to the reactor and phosgenation commenced. After completing addition of between 30 and 85 percent of the phosgene (about 0.3 to 0.9 mole of phosgene per mole of Bisphenol A), the balance of the sodium hydroxide is added. Almost simultaneously with or within several minutes of this reaction, the reaction medium surprisingly becomes emulsified. Thereafter, phosgene addition is completed.

Example IV

Into a three-necked, one liter glass flask equipped with a paddle stirrer, 68.4 grams (0.3 mole) of Bisphenol A, 180 milliliters of methylene chloride, 100 milliliters of water and 105 milliliters of 4 Normal aqueous sodium hydroxide solution were placed. The flask was immersed in an ice bath and during the reaction the temperature was then maintained at 25° C.

With the stirrer operating at 300 revolutions per minute, a total of 33 grams (0.33 mole) of gaseous phosgene was added to the liquid mixture in 50 minutes at a uniform rate with the exception that at the midpoint of phosgene addition, flow was halted for about 3 to 5 minutes while 105 milliliters of 4 Normal aqueous sodium hydroxide was added. During this pause and after addition of the sodium hydroxide, the reaction medium emulsified.

After stirring the reaction mixture for 2 hours subsequent to concluding phosgene addition, the polycarbonate did not contain detectable chloroformate chlorine. Polycarbonate product recovered by the procedure of Example I had a K-value of 53.

When Example IV is duplicated except that the second charge of sodium hydroxide is added when 30, 40, 60, 70 and 80 percent of the total phosgene feed is completed, comparable results ensue including emulsification and rapid obtention of high molecular weight polycarbonate.

This example demonstrates accomplishing the invention in the manner of Example IV on a larger scale:

Example V

A twenty-gallon, jacketed, stirrer-equipped kettle was charged with 26.4 liters of water, 6.84 kilograms (30.0 moles) of Bisphenol A and 3.3 kilograms (42.0 moles) of aqueous sodium hydroxide solution containing 50.97 percent NaOH by weight. A nitrogen atmosphere was maintained on the kettle. After the Bisphenol A dissolved completely, the reaction mixture was cooled to 25° C. by circulating a coolant in the jacket. Then, 18 liters of methylene chloride was added.

While maintaining the temperature at 25° C. and operating the stirrer at 120 revolutions per minute, 1.671 kilograms (17.0 moles) of gaseous phosgene was added at essentially constant rate in 36 minutes. Flow of phosgene was then halted for 10 minutes while 3.4 kilograms (42.0 moles) of aqueous sodium hydroxide containing 50.91 percent NaOH by weight was quickly added, care being taken to maintain the temperature at 25° C. During this sodium hydroxide addition, the mixture emulsified. Phosgene flow was resumed and 1.699 kilograms (17.0 moles) of additional phosgene were added in 50 minutes at an essentially constant rate.

After completing phosgene addition, operation of the stirrer and temperature control as performed during the phosgenation were continued for 2 hours during which time all chloroformate chlorine disappeared and formation of polycarbonate was completed. The emulsion was broken by the addition of 36 liters of methylene chloride, the organic phase separated, water washed free of chloride ion and polycarbonate precipitated as a granular product by addition of heptane to the methylene chloride solution.

Still other means emulsify the reaction medium to accelerate formation of high molecular weight polycarbonates. The following example illustrates one other such procedure:

Example VI

Into a five-necked, one liter glass flask were charged 68.4 grams (0.3 mole) of Bisphenol A, 180 milliliters of methylene chloride and 100 milliliters of water. A Beckman Zeromatic pH meter with a sleeve-type reference electrode and a standard glass electrode was properly inserted into the contents of the flask to measure the pH. Other necks of the flask were used to meter in gaseous phosgene and sodium hydroxide and also to insert the stirrer and thermometer.

The pH of the reaction mixture was then adjusted to pH 11 by charging 7 milliliters of 4 Normal aqueous sodium hydroxide solution. While the flask was immersed in an ice bath and held at 25° C. and the stirrer was operated to stir gently the contents, 33.6 grams (0.34 mole) of gaseous phosgene was metered into the liquid medium over a period of 50 minutes at the rate of 0.66 gram per minute. Aqueous 4 Normal sodium hydroxide was added as required to maintain the reaction mixture at pH 10.8 to 11 throughout the first 33 minutes of the phosgene addition. At this point, 50 milliliters of the 4 Normal sodium hydroxide solution was charged causing the medium to emulsify.

After completing the addition of phosgene while concurrently slowly adding the balance of sodium hydroxide to coincide with the end of phosgene addition (a total of 210 milliliters of 4 Normal sodium hydroxide solution), stirring was continued for 3 hours, at which time high molecular polycarbonate was obtained. It was recovered in the manner detailed in Example I, had a K-value of 53 and a chloroformate chlorine content of 0.001 percent by weight of the polycarbonate.

Example VII

Into a three-necked, one liter flask equipped with a paddle stirrer, 33.6 grams of sodium hydroxide and 450 milliliters of water were charged. After the hydroxide had dissolved, 68.5 grams of Bisphenol A was added. To this mixture, 135 milliliters of methylene chloride was added.

While operating the paddle stirrer at 300 revolutions per minute and maintaining the mixture at 25° C., 33.6 grams of phosgene was added uniformly over a period of 50 minutes.

Thereafter, the resulting medium was emulsified by allowing the reaction medium to separate into its two principal phases and then suddenly agitating the medium. This emulsion was stirred for 2 hours with the paddle stirrer. The emulsion then was broken by addition of methylene chloride and high molecular weight polycarbonate was recovered from the organic phase.

Example VIII

The procedure of Example VII was duplicated charging, however, 175 milliliters of water and 788 milliliters of methylene chloride. The emulsion was produced by the emulsification procedure of Example III. High molecular weight polycarbonate was recovered.

Example IX

The procedure of Example VII was duplicated using, however, 207 milliliters of water and 120 milliliters of methylene chloride with the temperature maintained at about 38° C. while refluxing methylene chloride in a reflux condenser attached to the flask. The reaction medium after being cooled to 25° C. was emulsified by the emulsification procedure of Example III. High molecular weight polycarbonate was, thereafter, recovered.

K-values are obtained by weighing 0.2500 gram of the polycarbonate into a 50 milliliter volumetric flask and then adding 25 milliliters of dioxane. Gentle heating on a steam bath with some shaking is used to obtain complete solution. The solution is well mixed and filtered through a coarse fritted glass filter using a minimum of vacuum. This filtrate is transferred to a volumetric flask and the filter apparatus washed with fresh dioxane, the washings being added to the volumetric flask. The viscosity of the filtrate is determined by transferring 10 milliliters of the solution to a modified Ostwald viscosimeter which is placed in a constant temperature bath at 25° C. for 5 minutes. The efflux time at 25° C. is determined. The dioxane solvent is filtered and its efflux time is determined in the same manner. The relative viscosity is the ratio of the solution efflux time to the solvent efflux time.

The log of the relative viscosity is determined and the K-value to which it corresponds is formed by reference to a graph which plots the relationship between known K-values and relative viscosities.

Considerable latitude in the other reaction conditions is permissible. Temperatures above the freezing point of the reaction mixture and below the boiling point of the organic solvent are suitable. Typical reaction temperatures range from 0° C. to 40° C. Somewhat higher temperatures, e.g., above the normal boiling point of the solvent (or above temperatures at which there is substantial volatilization of the solvent) are of use if recourse is had to sealed reactors (autogenous pressure) or superatmospheric pressure. Atmospheric pressure is common.

The total amount of sodium hydroxide or like inorganic alkali used in a given polycarbonate formation usually exceed stoichiometric. With Bisphenol A phosgenation, 2.5 to 4.0 moles of NaOH per mole of Bisphenol A is a typical range.

Complete conversion of the Bisphenol A is preferred. Hence, the other reactants, phosgene and inorganic alkali, are used in amounts consistent with obtaining directly a polycarbonate having a minimum or no Bisphenol A. However, it is not essential to the obtention of high molecular weight products to convert all Bisphenol A.

The ratio of water and organic solvent in the reaction medium facilitates emulsion formation. Relative volumes which render the reaction mixture most conducive to emulsification are on the order of 0.3 to 1.5 volumes of organic solvent per volume of water. Each of the useful organic solvents naturally will have within this range a particularly optimum volume ratio with the water. With methylene chloride, the preferred range is about 0.5 to 0.8 volume of solvent per volume of water. Although usually less conducive to emulsification, the volume ratio of solvent to water in the reaction medium may exceed 1.5 to 1.0 and range up to about 5.5 to 1.0 or higher. Obviously, the ratio is consistent with having sufficient water to provide for the discontinuous phase and sufficient solvent for the continuous phase of the emulsions used in performance of this invention.

A further factor contributing to the emulsibility of the reaction medium is the concentration of polycarbonate. When the concentration of polycarbonate is between 12 and 30 weight percent of the organic solvent, emulsification is effected somewhat more readily than with more dilute polycarbonate solutions. This makes it preferable to use Bisphenol A in a quantity which is about 10 to 30 percent by weight of the organic solvent. Polycarbonate concentrations much below about 1 or 2 percent by weight of the organic solvent although possible are rare because of economic considerations involved in handling dilute solutions. Higher polycarbonate concentrations include those of up to 60, 70 or more percent by weight of organic solution basis the polycarbonate-solvent content, including organic solvent-polycarbonate solutions substantially saturated with polycarbonate.

Organic solvents especially useful are essentially water insoluble, normally liquid, chemically inert in which the product polycarbonate is soluble. Most noteworthy are the normally liquid partially halogenated aliphatic hydrocarbons, especially chlorinated aliphatic hydrocarbons including chloroform, methylene chloride, methyl chloride, ethylene chloride, beta,beta'-dichloroethyl ether, ethylidene dichloride, dichloroethylene, trichloroethylene and the partially chlorinated propanes and butanes. Partially halogenated (chlorinated) aliphatic hydrocarbons of 1 to 4 carbon atoms having at least one carbon atom linked to both a hydrogen atom and a halogen (chlorine) atom are especially suitable. More volatile partially halogenated derivatives of ethane and methane, e.g., methyl chloride, ethyl chloride, monochlorodifluoromethane, may be used with suitable provision for maintaining the solvent in a liquid in the reaction medium. Other essentially water insoluble organic solvents in which the polycarbonate products are soluble to the extent of at least about 5 percent by weght are also useful.

Best of the inorganic alkali is sodium hydroxide. Other inorganic alkali especially water soluble alkali such as potassium hydroxide, lithium hydroxide, sodium carbonate and the like may be used in lieu of sodium hydroxide or in combination with each other.

This process is effective for the preparation of a wide variety of polycarbonates by the type of reaction previously discussed. One class of polycarbonates are the alkylidene bisphenol polycarbonates exemplified by Bisphenol A polycarbonates. Thus, polycarbonates may be prepared by this invention from these and like alkylidene bisphenols:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane
2,2-bis(3,3'-dimethyl-4,4'-dihydroxy-diphenyl)-propane Moreover, the polycarbonates may be prepared using mixtures of two or more such alkylidene bisphenols.

Besides bisphenols, polycarbonates prepared by the process herein described from polyhydroxy and notably dihydroxy benzenes and naphthalenes are susceptible of preparation. Typical compounds include: catechol, resorcinol, quinol, orcinol, mesorcinol, dihydroxyxylol, thymoquinol; naphthalene diols such as 1,3-dihydroxynaphthalene, 1,8 - dihydroxynaphthalene, 1,6-dihydroxynaphthalene, 2,7 - dihydroxynaphthalene; dihydroxydiphenyls such as 2,5-dihydroxydiphenyl, 2,2'-dihydroxydiphenyl, 2, 4' - dihydroxydiphenyl, 3,3'-dihydroxydiphenyl, 4,4'-dihydroxydiphenyl, 3,4-dihydroxydiphenyl.

Still other polyhydric compounds can be used in admixture with Bisphenol A or like aromatic diol. Cycloaliphatic diols are useful in this regard. Typical are 1,2 - cyclohexanediol, 1,3-cyclohexanediol, 1,4-cyclohexanediol, 1-methyl-cyclohexanediol-2,3, 1,2-cyclopentanediol, 1,3 - cyclopentanediol, 3,3'-dihydroxydicyclopentyl ether, hydrogenated alkylidene bisphenols illustrated by 4,4' - dihydroxydicyclohexyl - 2,2-propane and 1,2-dihydroxy-4-vinylcyclohexane. Aralkyl diols also may be used such as xylylene glycols including phthalyl alcohol, metaxylylene glycol, paraxylylene glycol; the dimethylxylylene glycols such as alpha,alpha'-dihydroxydurene and styryl glycol.

Other dihydric compounds also may be phosgenated or reacted with bischloroformates along with an aromatic diol (or chloroformate of an aromatic diol). Thus, a mixture of an aliphatic diol and a bisphenol may be phosgenated. These dihydrics include the saturated, acyclic dihydric alcohols, typical of which are ethylene glycol, propanediol-1,2, butanediol-1,3, butanediol-2,3, butanediol-1,2, butanediol-1,4, diethylene glycol, triethylene glycol, tetraethylene glycol, dipropylene glycol, tripropylene glycol, dibutylene glycol, tetrabutylene glycol and olefinically unsaturated dihydric alcohols such as 3-butenediol- 1,2. Polyglycols containing from 1 to 4 ether linkages and/or up to 12 carbon atoms as well as the corresponding thioglycols such as thiodiglycol, ethylene thiodiglycol are included.

While the invention is particularly related to the phosgenation of aromatic diols alone or together with other diols, bishaloformates and especially bischloroformates are capable of functioning to convert the dihydric compounds to polycarbonates. For example, the bischloroformate of Bisphenol A may be used in lieu of phosgene to convert Bisphenol A to a high molecular weight polycarbonate. Another illustration is the use of a bischloroformate of an aliphatic diol (diethylene glycol bischloroformate) and an alkylidene bisphenol (Bisphenol A). The mixed polycarbonates thus resulting contain residues of the bisphenol and the diol.

Besides the specific, and even preferred, expedients herein described for realizing the desired emulsification and polycarbonate formation, it will be understood that other techniques which provide for these emulsions may be employed.

This application is a continuation-in-part of application Serial No. 741,448, filed June 12, 1958, and application Serial No. 803,579, filed April 2, 1959.

While this invention has been described by reference to specific details of certain embodiments, it will be understood that the invention is not intended to be construed as limited to such details except insofar as they are included in the appended claims.

We claim:

1. In the method of preparing polycarbonate by reaction of an organic dihydroxy compound having two phenolic hydroxyl groups and a carbonate precursor selected from the group consisting of phosgene, bischloroformates of a dihydroxy organic compound and mixtures thereof in the reaction medium provided therefrom along with water, inorganic alkali and essentially water insoluble organic solvent for the polycarbonate which medium contains from 0.3 to 1.5 volumes of organic solvent per volume of water and in which the polycarbonate concentration is up to 30 percent by weight of the organic solvent, the improvement which comprises accelerating the rate at which high molecular weight polycarbonate is attained by forming the high molecular weight polycarbonate in a persistent emulsion of the medium which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

2. The method of claim 1 wherein the water insoluble organic solvent is a partially chlorinated liquid aliphatic hydrocarbon.

3. The method of claim 1 wherein the fine droplets are from 0.5 to 5 microns in diameter.

4. In the method of preparing polycarbonate wherein phosgene is passed into a reaction medium formed from alkylidene bisphenol, water, inorganic alkali and essentially water insoluble organic solvent for the polycarbonate which medium contains from 0.3 to 1.5 volumes of organic solvent per volume of water and in which the polycarbonate concentration is up to 30 percent by weight of the organic solvent, the improvement which comprises accelerating formation of high molecular weight polycarbonate by converting the reaction medium after passing thereinto at least 0.3 mole of phosgene per mole of alkylidene bisphenol into a persistent emulsion which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

5. The method of claim 4 wherein the alkylidene bisphenol is 2,2-(4,4'-dihydroxy-diphenyl)-propane.

6. The method of claim 4 wherein the organic solvent is partially chlorinated aliphatic hydrocarbon of 1 to 4 carbon atoms.

7. In the method of preparing polycarbonate by passing phosgene into a reaction medium formed from alkylidene bisphenol, water, inorganic alkali and essentially water insoluble partially chlorinated aliphatic hydrocarbon organic solvent for the polycarbonate which medium contains from 0.3 to 1.5 volumes of said organic solvent per volume of water and in which the polycarbonate concentration is up to 30 percent by weight of the organic solvent, the improvement which comprises accelerating formation of high molecular weight polycarbonate by converting the reaction medium after passing thereinto at least 0.3 mole of phosgene per mole of alkylidene bisphenol into a persistent emulsion which does not break upon standing for a period of one hour under quiescent conditions comprising a continuous phase of partially chlorinated aliphatic hydrocarbon solvent for the polycarbonate having dispersed therein at least 50 weight percent of the aqueous phase of the medium in the form of fine droplets as a discontinuous phase, said emulsion occupying a greater volume than that of the organic phase which would form upon phase separating the medium prior to emulsification.

8. The method of claim 7 wherein the fine droplets are from 0.5 to 5 microns in diameter.

9. The method of claim 7 wherein the reaction medium is emulsified after completing the addition of phosgene.

10. The method of claim 7 wherein the organic solvent is methylene chloride, the alkylidene bisphenol is 2,2-(4,4'-dihydroxy-diphenyl)-propane and the inorganic alkali is sodium hydroxide.

11. In the method of preparing polycarbonate by reaction of an organic dihydroxy compound having two phenolic hydroxyl groups and a carbonate precursor selected from the group consisting of phosgene, bischloroformates of a dihydroxy organic compound and mixtures thereof in the reaction medium provided therefrom along with water, inorganic alkali and essentially water insoluble organic solvent for the polycarbonate which medium contains from 0.3 to 5.5 volumes of organic solvent per volume of water and in which the polycarbonate concentration is up to 30 percent by weight of the organic solvent, the improvement which comprises accelerating the rate at which high molecular weight polycarbonate is attained by forming the high molecular weight polycarbonate in a persistent emulsion of the medium which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

12. In the method of preparing polycarbonate by reaction of an organic dihydroxy compound having two phenolic hydroxyl groups and a carbonate precursor selected from the group consisting of phosgene, bischloroformates of a dihydroxy organic compound and mixtures thereof in the reaction medium provided therefrom along with water, inorganic alkali and essentially water insoluble organic solvent for the polycarbonate which medium contains from 0.3 to 5.5 volumes of organic solvent per volume of water and in which the polycarbonate concentration is up to the polycarbonate solubility in the organic solvent, the improvement which comprises accelerating the rate at which high molecular weight polycarbonate is attained by forming the high molecular weight polycarbonate in a persistent emulsion of the medium which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

13. In the method of preparing polycarbonate by reaction of an organic dihydroxy compound having two phenolic hydroxyl groups and a carbonate precursor selected from the group consisting of phosgene, bischloroformates of a dihydroxy organic compound and mixtures thereof in the reaction medium provided therefrom along with water, inorganic alkali and essentially water insoluble organic solvent for the polycarbonate which medium contains from 0.3 to 5.5 volumes of organic solvent per volume of water and in which the polycarbonate concentration is up to 70 percent by weight of the organic solution, the improvement which comprises accelerating the rate at which high molecular weight polycarbonate is attained by forming the high molecular weight polycarbonate in a persistent emulsion of the medium which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

14. In the method of preparing polycarbonate by reaction of an organic dihydroxy compound having two phenolic hydroxyl groups and a carbonate precursor selected from the group consisting of phosgene, bischloroformates of a dihydroxy organic compound and mixtures thereof in the reaction medium provided therefrom along with water, inorganic alkali and essentially water insoluble organic solvent for the polycarbonate which medium contains sufficient organic solvent and water to provide upon emulsification for a continuous organic solvent phase having therein dispersed a discontinuous aqueous phase and in which the polycarbonate concentration is up to the polycarbonate solubility in the organic solvent, the improvement which comprises accelerating the rate at which high molecular weight polycarbonate is attained by forming the high molecular weight polycarbonate in a persistent emulsion of the medium which does not break upon standing for a period of one hour under quiescent conditions comprising a continuous phase of water insoluble organic solvent for the polycarbonate having dispersed therein at least 50 weight percent of the aqueous phase of the medium in the form of fine droplets as a discontinuous phase.

15. The method of claim 14 wherein the polycarbonate concentration is at least one percent by weight of the organic solvent but not in excess of that concentration which provides for an organic solution substantially saturated with polycarbonate.

References Cited in the file of this patent

UNITED STATES PATENTS

| | | |
|---|---|---|
| 2,658,886 | Swerdloff et al. | Nov. 10, 1953 |
| 2,816,879 | Wittbecker | Dec. 17, 1957 |
| 2,964,797 | Peilstöcker | Dec. 20, 1960 |

FOREIGN PATENTS

| | | |
|---|---|---|
| 772,627 | Great Britain | Apr. 17, 1957 |
| 576,639 | Canada | May 26, 1959 |
| 578,585 | Canada | June 30, 1959 |

OTHER REFERENCES

Schnell: Angewandte Chemie, volume 68, No. 20, 1956, pages 633–640 (pages 635 and 636 relied on).